United States Patent [19]

Gatellier et al.

[11] 4,382,873

[45] May 10, 1983

[54] DISPERSANT AND BIODEGRADANT FORMULATIONS FOR TREATING HYDROCARBON-POLLUTED WATERS

[75] Inventors: Claude Gatellier, Boulogne; Andrée Plessis, Le Vesinet; Patrick Gateau, Trappes; Jean-Pierre Durand, Chatou, all of France

[73] Assignee: Institut Francais du Petrole, Rueil-Malmaison, France

[21] Appl. No.: 218,246

[22] Filed: Dec. 19, 1980

[30] Foreign Application Priority Data

Dec. 20, 1979 [FR] France ........................... 79 31562

[51] Int. Cl.³ ............................................. B01J 13/00
[52] U.S. Cl. ............................... 252/312; 210/610; 252/311; 252/356; 435/281; 528/257; 528/258

[58] Field of Search ............... 252/311, 312; 528/257, 528/258; 210/610; 435/281

[56] References Cited

U.S. PATENT DOCUMENTS

| | | | |
|---|---|---|---|
| 2,285,750 | 6/1942 | Swain | 528/257 |
| 3,714,063 | 1/1973 | Salomone | 435/281 |
| 3,959,127 | 5/1976 | Bartha et al. | 210/610 |
| 4,230,562 | 10/1980 | Olivieri et al. | 210/610 |

*Primary Examiner*—Lucille M. Phynes
*Attorney, Agent, or Firm*—Millen & White

[57] ABSTRACT

Dispersant and biodegradant formulations are manufactured by admixing at least one melamine derivative with at least one compound having a hydroxy function, at least one phosphorus compound and at least one surfactive agent. Aqueous emulsions obtained from these formulations are also provided.

23 Claims, No Drawings

DISPERSANT AND BIODEGRADANT FORMULATIONS FOR TREATING HYDROCARBON-POLLUTED WATERS

BACKGROUND OF THE INVENTION

The present invention relates to new formulations which can be used to purify fresh water and sea water from pollutions of petroleum origin.

This type of pollution, which is caused by crude petroleum and its refinery fractions, and more generally by hydrocarbons, can be fought by using physico-mechanical techniques adapted to collect the pollutants, although in many cases these techniques cannot be used; it is then necessary to leave in place the major part of the pollutants in the least detrimental form possible, for a sufficient time to allow microorganisms affect a purifying degradation, these microorganisms being naturally present or added to the medium, for example as lyophilisates, the metabolism of which must be ensured.

It is also well known that the microflora found in the ground, in sediments, in fresh water or in sea water comprises several microbial species able to convert and assimilate most of the hydrocarbons and oil products, but the rate of the biochemical reactions and the intensity of the conversion are limited by several physico-chemical factors, particularly an insufficient concentration of the compounds supplying assimilable phosphorus and nitrogen to the microflora; another limitation results from the contact surface between oil and water whose interfacial surface, a privileged place for the degradation reactions, must be colonized by the purifying microflora.

It has long been known that the biodegradation of petroleum materials can be accelerated by adding fertilizers such as ammonium salts, nitrates and phosphates; however, in open medium, it is uneconomical to merely add these salts to water or to the polluted ground, since they have a too high solubility in water.

To obviate this disadvantage, several authors have proposed the use of oil-soluble compounds comprising nitrogen and phosphorus. The use of lecithin is thus proposed in the French Pat. No. 2 392 941, and the use of ureidic derivatives of organic aldehydes comprising at least 4 carbon atoms is disclosed in the French Pat. No. 2 346 292. The latter compounds have however the disadvantage of being expensive.

New inexpensive biodegradable formulations have now been discovered, which are both oil-dispersant and nutritive for microorganisms.

SUMMARY OF THE INVENTION

Broadly, the formulations of the invention are obtained from nitrogen compounds consisting of melamine derivatives, compounds having a hydroxy function, phosphorus compounds and surfactive agents.

DETAILED DISCUSSION

More precisely, the nitrogen compound derived from melamine may result:
from the reaction of melamine with formaldehyde; or
from the reaction of melamine with urea and formaldehyde.

These condensation products may be obtained, for example, by reacting an aqueous formaldehyde solution, whose pH has been brought to between 8 and 9, with melamine and optionally urea in such proportions that the ratio of the $NH_2$ function to the CHO function is between 0.5 and 3 and preferably of about 1.5.

At least one compound having a hydroxy function is added to these condensation products, which compound comprises, for example, from 1 to 6 carbon atoms and is selected from the mono-alcohols and the monoalkyl derivatives of ethylene glycol. Examples of these compounds are methanol, ethanol, isopropanol, ethylene glycol monoethyl ether and ethylene glycol monobutyl ether. Ethylene glycol monoethyl ether is preferably used.

When manufacturing the formulations according to the invention, the compound which supplies the hydroxy function is usefully added as soon as melamine has been reacted for condensation with formaldehyde or with urea and formaldehyde.

As a rule, the pH of the resultant solutions is then brought to a value of 8.5 to 10, for example, by adding soda or potash.

The phosphorus derivatives to be used in the formulation of the invention are more particularly selected from the potassium salts of the phosphoric esters of oxyethylenated fatty alcohols and the neutralized phosphated oxyethylenated alkylphenols.

The surface-active agents which are present in the formulations of the invention are selected from the products having a hydrophilic/lipophilic balance (HLB) between 1 and 13, preferably between 4 and 9.

The following compounds are mentioned by way of example:

| | |
|---|---|
| sorbitan monolaurate HLB: | 1.9 |
| ethylene glycol monostearate | 2.0 |
| sorbitan trioleate | 2.5 |
| glycerol monolaurate | 4.0 |
| sorbitan monooleate | 4.3 |
| anhydrosorbitol monooleate | 5.3 |
| ethoxylated $C_{12}$-$C_{13}$ primary alcohols | 6.2 |
| polyethyleneglycol 400 dioleate | 7.2 |
| polyethyleneglycol 300 monooleate | 9.5 |
| polyethyleneglycol 400 monooleate | 11.0 |

It is possible, and in most cases advisable, to use at least two different surface-active agents. In that case, the overall HLB value must be in the intervals mentioned above.

The formulations of the invention may also be prepared from condensation derivatives of melamine etherified in acidic medium with a monoalcohol such as methanol, ethanol, propanol and butanol or with an ethylene glycol monoalkyl derivative.

As above, these formulations also comprise phosphorus compounds and surface-active agents.

When manufacturing the formulations of the invention, the melamine derivative compounds are used in such manner that the total nitrogen content of said formulations is advantageously between 4 and 8% b.w. The phosphorus derivatives are used in such proportions that the total phosphorus content of the formulations is usefully between 0.1 and 0.9% b.w. The alcohol or the ethylene glycol monoalkyl derivative represents advantageously 7 to 30% of the total weight.

The formulations of the invention are used, for example, by spraying over the polluted surface, either as such or as an aqueous emulsion, which may be obtained by diluting one of the formulations in fresh water or in sea water in a proportion of between 5 and 20% by weight, preferably about 10% by weight.

One of the important advantages of these dispersant formulations, to be used for treating petroleum pollutions, is linked to the synthetic organic materials that they contain and which are used as nutritive materials by the microorganisms which metabolize hydrocarbons.

These dispersant formulations have also biodegradation properties since they accelerate the mechanism of biological degradation of the oil pollutions without further disturbing the ecological balance of the medium.

The present invention is illustrated by the following examples which constitute no limitation thereof.

Example 1 illustrates the biodegradable nature of the melamine condensation product (the other constituents of the formulations according to the invention are products whose biodegradability is already well-known).

EXAMPLE 1

42 g of melamine and 60 g of urea are added to 155 g of an aqueous formaldehyde solution (formaldehyde content: 38.7% by weight) whose pH has been brought to 8.5 by means of potash. The mixture is stirred at 90° C. for 15 minutes, and then brought back to room temperature. 110 g of ethylene glycol monoethylether is then added. The pH is brought to 9.5 by means of potash.

The resultant product is a homogeneous clear liquid of low viscosity, whose nitrogen content is 21.8% by weight.

Its total biodegradability is evaluated according to a method derived from the AFNOR T 90-302 standard; its biodegradation rate, as determined by the organic carbon, is 89% in 42 days.

EXAMPLE 2

126 g of melamine are added to 155 g of an aqueous formaldehyde solution (formaldehyde content: 38.7% by weight) whose pH has been brought to 8.5 by means of potash.

The mixture is stirred at 80° C. for 1 hour, and then brought back to room temperature; 110 g of ethylene glycol monoethylether is then added. The pH is brought back to 9 by means of potash. The resultant product may be used as an additive to a dispersant of the trade and thus supply biodegradation properties.

In this example, the reaction product is poured into 500 g of the COREXITT 9527 product (protected trade mark).

The biodegradation properties are evidenced by means of a 20 days experiment in bottles containing sea water with added potassium monophosphate and crude petroleum.

In the bottles treated with COREXIT alone, the initial weight of petroleum is found again. In those treated with doped COREXIT, only half of the initial petroleum weight can be found again.

The evaluation of the degradation rate has been effected by extracting residual petroleum with carbon tetrachloride and by infra-red spectrophotometry.

EXAMPLE 3

42 g of melamine and 60 g of urea are added to 155 g of an aqueous formaldehyde solution (formaldehyde content: 38.7% b.w.) whose pH has been brought to 8.5 by means of potash. The mixture is stirred at 90° C. for 15 minutes and then brought back to room temperature. A mixture of surfactive agents with ethylene glycol monoethylether is then added, comprising 300 g of polyethyleneglycol 400 monooleate (SECOSOV MO 400 trade mark), 200 g of oxyethylenated sorbitan monooleate (TWEEN 85 trade mark), 107 g of an oxyethylenated octyl alcohol phosphoric ester (PHOSPHAC M6 A 0 trade mark), 1.3 g of potash and 110 g of ethylene glycol monoethylether.

The resultant material is a clear homogeneous liquid of low viscosity, whose nitrogen content is 5.8% by weight.

This dispersant material is subject to the experimental method for determining the effective emulsifying concentration, as disclosed in the Report of the French Environment State Department concerning the approval of oil dispersants: the effective concentration is found to be 2.3% b.w.

EXAMPLE 4

Example 3 is repeated, except that ethyleneglycol monoethylether is replaced with 50 g of isopropanol. The results are substantially the same of those of example 3.

The effective concentration of the formulation is 3.2% by weight.

EXAMPLE 5

Example 3 is repeated, except that the reactants are stirred at 60° C. for 4 hours, instead of 90° C. for 15 minutes, and except that ethyleneglycol monoethylether is added at 60° C.; the resultant homogeneous liquid has substantially the same properties as those of the product of example 3.

EXAMPLE 6

42 g of melamine are added to 155 g of an aqueous formaldehyde solution (formaldehyde content: 38.7% b.w.) whose pH has been brought to 8.5 by means of potash. After stirring of the mixture at 90° C. for 15 minutes, 60 g of urea are added and the mixture is stirred again at 90° C. for 15 minutes. The reaction mixture is brought back to room temperature. A mixture of surfactive agents with ethyleneglycol monobutylether is then added, comprising 163 g of polyethylene glycol 400 monooleate (SECOSOV MTO 400 trade mark), 54 g of sodium dioctylsuccinate as a 70% b.w. solution in a 40/60 b.w. mixture of water with ethanol, 54 g of oxyethylenated sorbitan oleate (SORBAPHOR TO trade mark), 109 g of an oxyethylenated tridecyl phosphoric ester (PHOSPHAC 3 TD trade mark), 1.5 g of potash and 110 g of ethylene glycol monobutylether.

The resultant material is a clear homogeneous liquid of low viscosity, which can be dispersed as a slurry into fresh water or sea water. Its nitrogen content is 5.9% b.w.

This dispersant material, when subjected to the same test as disclosed in example 3, has an effective concentration of 1.8% b.w.

EXAMPLE 7

42 g of melamine are added to 155 g of an aqueous formaldehyde solution (containing 38.7% b.w. of formaldehyde) whose pH has been brought to 9 by means of potash. The mixture is stirred at 90° C. and 60 g of urea are added, the temperature being maintained unchanged for a total time of 20 minutes.

Stirring is continued and the temperature is brought back in 30 mn to room temperature.

A previously prepared mixture of surfactants with ethylene glycol monoethylether, whose pH has been brought to 9.5 by means of potash, is then added. This additional mixture comprises 116 g of polyethyleneglycol 400 monooleate (SECOSOV MTO trade mark), 58 g of sodium dioctylsuccinate at a concentration of 70% b.w. in ethylglycol, 19 g of oxyethylene sorbitan oleate (SORBAPHOR TO trade mark), 32 g of ethoxylated octyl alcohol phosphoric ether (PHOSPHAC M6 A 0 trade mark), 6.5 g of ethoxylated tridecyl alcohol phosphoric ether (trade mark: PHOSPHAC 6 TD) and 150 g of ethyleneglycol monoethylether.

The final product is tested for total biodegradability according to a method derived from the AFNOR T90-302 method; the total organic carbon is determined, which evidences a biodegradation rate of 97% in 42 days.

The dispersant properties of the final product are evidenced by determining the effective concentration, according to the method described in example 3: its value is 0.9% b.w.

The biodegradation properties of the final product are evidenced by a test in stirred flasks incubated at 15° C. after inoculation with a micro-flora from a sea sediment.

Each flask contains 500 ml of sea water and 150 mg of petroleum topped at 150° C.

When adding the surfactant bases alone, no evolution of the oil content is observed. In the flasks containing nutritive salts (ammonium salts, phosphates) without surfactants, a low degradation of the oil is observed (25% in 20 days).

In the flasks containing the surfactant bases and the nutritive salts, the degradation amounts to 61% in 20 days.

In the flasks treated with a slurry of 180 mg sea water and 20 mg of the dispersant-biodegradant product of the invention, as hereinbefore indicated, the degradation amounts to 76% in 20 days.

The evaluation of the degradation rates has been effected by extracting the residual oil with carbon tetrachloride and by infra-red spectrophotometry.

What we claim is:

1. A biodegradable composition which is both an oil dispersant and a nutrient for microorganisms, and which is useful for accelerating the microbiological degradation of petroleum materials in water, said composition comprising:
    (a) at least one assimilable nitrogen compound, said compound being a condensation product of melamine and formaldehyde or a condensation product of melamine with urea and formaldehyde;
    (b) at least one organic hydroxy compound;
    (c) at least one assimilable phosphorus compound; and
    (d) at least one surface-active agent.

2. A composition according to claim 1, wherein said hydroxy compound (b) is a $C_{1-6}$ mono-alchol or ethyleneglycol monoalkyl derivative.

3. A composition according to claim 1, wherein said hydroxy compound (b) is ethylene glycol mono-ethyl ether or ethyleneglycol mono-butyl ether.

4. A composition according to claim 1, wherein said hydroxy compound (b) is added to freshly prepared melamine condensation product (a) in formulating the composition.

5. A composition according to claim 1, wherein said melamine condensation product (a) is etherified with a $C_{1-6}$ alcohol or ethyleneglycol monoalkyl derivative.

6. A composition according to claim 1, wherein said phosphorus compound (c) is a potassium salt of an oxyethylenated fatty alcohol phosphoric ester or a neutralized phosphated oxyethylenated alkylphenol.

7. A composition according to claim 1, wherein said surface-active agent (d) has a hydrophilic-lipophilic balance of 1 to 13.

8. A composition according to claim 7, wherein said surface-active agent (d) has a hydrophilic-lipophilic balance of 4 to 9.

9. A composition according to claim 1, which comprises at least two surface-active agents (d) having a combined hydrophilic-lipophilic balance of 1 to 13.

10. A composition according to claim 1, whose nitrogen content is from 4 to 8% by weight.

11. A composition according to claim 1, whose phosphorus content is from 0.1 to 0.4% by weight.

12. A composition according to claim 11, whose mono-alcohol content or ethylene glycol mono-alkyl derivative content is from 7 to 30% by weight.

13. An aqueous emulsion which comprises from 5 to 20% by weight of a composition according to claim 12 in fresh water or sea water.

14. A composition according to claim 1, wherein said hydroxy compound (b) is a mono-alcohol or an ethylene glycol mono-alkyl derivative.

15. A composition according to claim 14, wherein said ethylene glycol mono-alkyl derivative is an ethylene glycol mono-alkyl ether.

16. A composition according to claim 1, wherein said hydroxy compound (b) is a $C_{1-6}$ mono-alcohol or ethylene glycol mono-alkyl ether; said phosphorus compound (c) is a potassium salt of an oxyethylenated fatty alcohol phosphoric ester or a neutralized phosphated oxyethylenated alkylphenol; and said surface-active agent (d) has a hydrophilic-lipophilic balance of 1 to 13.

17. A composition according to claim 1, wherein said assimilable nitrogen compound (a) is a condensation product of melamine with formaldehyde.

18. A composition according to claim 17, wherein said melamine condensation product with formaldehyde is prepared by reacting an aqueous formaldehyde solution whose pH has been adjusted to 8-9, with melamine, the ratio of $NH_2$ groups to CHO groups being 0.5-3.

19. A composition according to claim 1, wherein said assimilable nitrogen compound (a) is a condensation product of melamine with urea and formaldehyde.

20. A composition according to claim 19, wherein said melamine condensation product with formaldehyde and urea is prepared by reacting an aqueous formaldehyde solution whose pH has been adjusted to 8-9, with melamine and urea, the ratio of $NH_2$ groups to CHO groups being 0.5-3.

21. A composition according to claim 20, wherein the molar ratio of melamine to urea is at least 1:3.

22. A composition according to claim 1, wherein said surface-active agent (d) is at least one of sorbitan monolaurate, ethylene glycol monostearate, sorbitan trioleate, glycerol monolaurate, sorbitan monooleate, anhydrosorbitol monooleate, ethoxylated $C_{12}$-$C_{13}$ primary alcohols, polyethyleneglycol 400 dioleate, polyethyleneglycol 300 monooleate, polyethyleneglycol 400 monooleate.

23. A composition according to one of claims 2-9, or 1-25 having a nitrogen content of 4-8% by weight, a phosphorus content of 0.1-0.4% by weight; and a hydroxy compound content of 7-30% by weight.

* * * * *

UNITED STATES PATENT AND TRADEMARK OFFICE
CERTIFICATE OF CORRECTION

PATENT NO. : 4,382,873
DATED : May 10, 1983
INVENTOR(S) : CLAUDE GATELLIER ET AL

It is certified that error appears in the above-identified patent and that said Letters Patent is hereby corrected as shown below:

Column 6, lines 64 and 65: reads " 23. A composition according to one of claims 2-9, or 1-25 having a nitrogen content of 4-8% by weight, a "

should read -- 23. A composition according to one of claims 2-9, or 1-22 having a nitrogen content of 4-8% by weight, a -- .

Signed and Sealed this

Twentieth Day of September 1983

[SEAL]

Attest:

*Attesting Officer*

GERALD J. MOSSINGHOFF
*Commissioner of Patents and Trademarks*

UNITED STATES PATENT AND TRADEMARK OFFICE
CERTIFICATE OF CORRECTION

PATENT NO. : 4,382,873
DATED : May 10, 1983
INVENTOR(S) : Claude Gattellier et al It is certified that error appears in the above-identified patent and that said Letters Patent is hereby corrected as shown below:

Column 6, line 18: reads " 12. A composition according to claim 11, whose "
should read -- 12. A composition according to claim 14, whose -- .

Column 6, line 22: reads " 20% by weight of a composition according to claim 12 "
should read -- 20% by weight of a composition according to claim 23 -- .

Column 6, lines 64 and 65: reads " 23. A composition according to one of claims 2-9, or 1-25 having a nitrogen content of 4-8% by weight, a "
should read -- A composition according to one of claims 1-9, or 14-22 having a nitrogen content of 4-8% by weight, a -- .

Signed and Sealed this

Twelfth Day of March 1985

[SEAL]

Attest:

DONALD J. QUIGG

Attesting Officer    Acting Commissioner of Patents and Trademarks